United States Patent
Oyama et al.

(10) Patent No.: US 11,069,177 B2
(45) Date of Patent: Jul. 20, 2021

(54) DEVICE AND METHOD FOR DISPLAYING AN INVENTORY OF GAME ITEMS BASED ON THEIR EXPIRATION DATE

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/143,630

(22) Filed: Sep. 27, 2018

(65) Prior Publication Data

US 2019/0102973 A1    Apr. 4, 2019

(30) Foreign Application Priority Data

Sep. 29, 2017   (JP) ............................. JP2017-191212

(51) Int. Cl.
*G07F 17/32*   (2006.01)
*G06F 3/0481*   (2013.01)

(52) U.S. Cl.
CPC ...... *G07F 17/3211* (2013.01); *G06F 3/04817* (2013.01)

(58) Field of Classification Search
CPC .................. G07F 17/3211; G06F 3/04817
See application file for complete search history.

(56) References Cited

U.S. PATENT DOCUMENTS

| | | | |
|---|---|---|---|
| 9,336,508 B2* | 5/2016 | Soon-Shiong | G06Q 30/06 |
| 2011/0126272 A1* | 5/2011 | Betzler | G06F 21/41 726/6 |
| 2014/0129393 A1* | 5/2014 | Soon-Shiong | G06Q 30/06 705/27.2 |
| 2017/0052676 A1* | 2/2017 | Pulier | G06F 3/04817 |
| 2017/0083959 A1* | 3/2017 | Bousis | G06Q 30/0609 |
| 2017/0123750 A1* | 5/2017 | Todasco | G06F 3/1454 |
| 2017/0269689 A1* | 9/2017 | Levesque | G06F 3/016 |
| 2017/0340963 A1* | 11/2017 | Bucher | G06Q 50/01 |
| 2018/0005174 A1* | 1/2018 | Dixon | G06Q 30/0202 |
| 2018/0104586 A1* | 4/2018 | Kim | A63F 13/12 |
| 2018/0361257 A1* | 12/2018 | Curtis | A63F 13/847 |

* cited by examiner

*Primary Examiner* — Corbett B Coburn
(74) *Attorney, Agent, or Firm* — Lex IP Meister, PLLC

(57) ABSTRACT

The user interface associated with the item is improved. The information processor 1 displays the first item display screen 22 in which the first item icons 221 corresponding to the types of the possessed items are displayed in a list correspondingly to the possessed number. The information processor 1 switches the second item display screen 23 to display in which the second item icons 231 corresponding to the possessed items are displayed in a list correspondingly to the expiration date when the first item icon 221 in the first item display screen 22 is operated by being pressed for a long time.

17 Claims, 13 Drawing Sheets

FIG.6

ITEM INFORMATION TABLE

| ITEM ID | ITEM | APPLICABLE TIME | ITEM DESCRIPTION |
|---|---|---|---|
| 001 | ITEM A | 5 MINUTES | RAISING THE PROBABILITY OF BECOMING A FREE GAME BY 1.2 TIMES (5 MINUTES) |
| 002 | ITEM B | 10 MINUTES | RAISING THE PROBABILITY OF BECOMING A FREE GAME BY 1.2 TIMES (10 MINUTES) |
| 003 | ITEM C | 30 MINUTES | RAISING THE PROBABILITY OF BECOMING A FREE GAME BY 1.2 TIMES (30 MINUTES) |
| 004 | ITEM D | 5 MINUTES | PERFORMING A SLOT GAME IN A HIGH SPEED (5 MINUTES) |
| 005 | ITEM E | 10 MINUTES | PERFORMING A SLOT GAME IN A HIGH SPEED (10 MINUTES) |
| 006 | ITEM F | 30 MINUTES | PERFORMING A SLOT GAME IN A HIGH SPEED (30 MINUTES) |
| 007 | ITEM G | 5 MINUTES | SKIPPING A SLOT GAME (5 MINUTES) |
| 008 | ITEM H | 10 MINUTES | SKIPPING A SLOT GAME (10 MINUTES) |
| ... | ... | ... | ... |

FIG.7

POSSESSED ITEM MANAGEMENT TABLE

| POSSESSED ITEM ID | ITEM ID | EXPIRATION DATE |
|---|---|---|
| 0000 | 001 | 2017/07/27 17:00 |
| 0001 | 007 | 2017/08/01 17:00 |
| 0002 | 002 | 2017/08/12 17:00 |
| 0003 | 003 | 2017/07/30 17:00 |
| 0004 | — | — |
| 0005 | 008 | 2017/09/01 17:00 |
| 0006 | 021 | 2017/08/27 17:00 |
| ... | ... | ... |

FIG.8

USED ITEM MANAGEMENT TABLE

| ITEM ID | APPLICABLE DATE |
|---|---|
| 004 | 2017/07/27 16:25 |
| 001 | 2017/07/27 16:31 |
| 004 | 2017/07/27 16:45 |
| 012 | 2017/07/27 16:48 |

DEVICE AND METHOD FOR DISPLAYING AN INVENTORY OF GAME ITEMS BASED ON THEIR EXPIRATION DATE

CROSS-REFERENCE TO RELATED APPLICATION

This application claims the benefit of Japanese Pat. App. No. 2017-191212, filed on Sep. 29, 2017, which application is incorporated herein by reference in its entirety.

BACKGROUND OF THE INVENTION

1. Field of Invention

The present invention relates to an information processor, a non-transitory computer-readable medium, and a game control method.

2. Description of Related Art

In the past, there was a configuration in which a game is performed through cooperation between gaming terminals by connecting a plurality of gaming terminals via a server. For example, the specification of U.S. Pat. No. 8,636,593 discloses a configuration having a plurality of gaming terminals and a plurality of upper displays forming a common effect display screen, and wherein the gaming terminal determines whether or not a common game is being performed at the start of an independent special game, and the effect is performed in the gaming terminal only when the common game is not performed. As such, for a long time, it has paid attention to performing a game through gaming competition among gaming terminals as a way to increase the fun of gaming and the value of gaming machines.

In addition, in recent years, games provided by portable terminals such as a tablet, a smart phone and the like have become increasingly popular. In games of such portable terminals, it also pays attention to playing a game through competition among users, however, unlike the conventional dedicated gaming machines, items that contribute to the improvement of competitiveness with others in games and items for exchanging with such items generally exist as charging elements. The game provider has a requirement to keep a user who wants to use the item playing the game.

The game of the portable terminals is mostly provided in a basic play free manner, and can be easily installed in a portable terminal by downloading and easily introduced, so the user can play a large number of games. However, in general, a game in which a user continues to play for a long time is only a limited part thereof. Therefore it is difficult to cause a user to select a game which is provided as an object which is played continuously, and to make an interface related to the item easy to use in the game and to reduce the burden on the use of the paid element become a problem to be solved.

SUMMARY OF THE INVENTION

Accordingly, an object of the present invention is to provide an information processor, a non-transitory computer-readable medium, and a game control method capable of improving a user interface related to the item.

The information processor of the present invention comprises:
a display for displaying a screen;
a touch panel for receiving a touch operation of a user;
a memory for storing possessed items that are usable in a game and possessed by the user in association with expiration dates of the possessed items; and
a controller, which is programmed to execute:
a process of displaying on the display a first item display screen in which first item icons corresponding to types of the possessed items are displayed in a list correspondingly to a possessed number; and
a process of switching from the first item display screen to a second item display screen in which second item icons corresponding to the possessed items are displayed in a list correspondingly to the expiration dates when it is determined that an operation received by the touch panel is a predetermined operation.

Generally, the motivation for the user to use the possessed item is to use the item because it is easier to obtain than the other possessed item to possess a large amount, and to use the item the expiration date of which is near before the expiration date arriving. According to the configuration mentioned above, the first item icons in which the possessed numbers are associated with the types of the possessed items are displayed in the first item display screen, and a display is switched to the second item display screen when the predetermined operation is performed, and the second item icons which are associated with the expiration dates of the items are displayed. Therefore, the user is allowed to know the possessed number for each the type of the possessed item in the first item display screen, and know the existence of the item that is near the expiration date in the second item display screen. As a result, it can improve the user interface associated with the item.

In the information processor of the present invention,
the controller may be programmed to execute:
a process of orderly arranging the second item icons to display in a list as an order of the expiration dates in the second item display screen.

According to the configuration mentioned above, since the second item icons are orderly arranged on the second item display screen 23 in the order of the expiration dates, the user can easily know the item having the shortest expiration date.

In the information processor of the present invention,
the touch panel may be provided on an entire surface of the display,
the predetermined operation includes an operation of designating any one of the first item icons,
the controller may be programmed to execute:
a process of displaying the second item icon with the shortest expiration date in the possessed items corresponding to the designated first item icon in a screen of the display when switching from the first item display screen to the second item display screen.

According to the configuration mentioned above, the user can easily know the item with the shortest expiration date of the items designated by the user when the second item display screen is displayed by performing an operation of designating a certain first item icon in the first item display screen.

The present invention is a non-transitory computer-readable medium storing a game program for causing a computer which comprises a display for displaying a screen, a touch panel for receiving a touch operation of a user, and a memory for storing possessed items that are usable in a game and possessed by the user in association with expiration dates of the possessed items to execute:
a process of displaying on the display a first item display screen in which first item icons corresponding to types of the possessed items are displayed in a list correspondingly to a possessed number; and a process of switching from the first item display screen to a second item display screen in which second item icons corresponding to the possessed items are displayed in a list correspondingly to the expiration dates when it is determined that an operation received by the touch panel is a predetermined operation.

According to the configuration mentioned above, the first item icons associated with the possessed number are displayed in the first item display screen as the types of the possessed items, and a display is switched to the second item display screen when the predetermined operation is performed, and the second item icons which are associated with the expiration dates of the items are displayed. Therefore, the user is allowed to know the possessed number for each type of the possessed item in the first item display screen, and know the existence of the item that is near the expiration date in the second item display screen. As a result, it can improve the user interface associated with the item.

The present invention is a game control method executed by a computer which comprises a display for displaying a screen, a touch panel for receiving a touch operation of a user, and a memory for storing possessed items that are usable in a game and possessed by the user in association with expiration dates of the possessed items, and wherein causing the computer to execute:

a process of displaying on the display a first item display screen in which first item icons corresponding to types of the possessed items are displayed in a list correspondingly to a possessed number; and a process of switching from the first item display screen to a second item display screen in which second item icons corresponding to the possessed items are displayed in a list correspondingly to the expiration dates when it is determined that an operation received by the touch panel is a predetermined operation.

According to the configuration mentioned above, the first item icons associated with the possessed number are displayed in the first item display screen as the types of the possessed items, and a display is switched to the second item display screen when the predetermined operation is performed, and the second item icons which are associated with the expiration dates of the items are displayed. Therefore, the user is allowed to know the possessed number for each type of the possessed item in the first item display screen, and know the existence of the item that is near the expiration date in the second item display screen. As a result, it can improve the user interface associated with the item.

The present invention can improve the user interface associated with the item.

BRIEF DESCRIPTION OF THE DRAWINGS

FIG. 6 is an illustrative view of an item information table.

FIG. 7 is an illustrative view of a possessed item management table.

FIG. 8 is an illustrative view of a used item management table.

DESCRIPTION OF THE PREFERRED EMBODIMENTS

The information processor of the present invention will be described based on the drawings.

(Summary)

Figure 1:
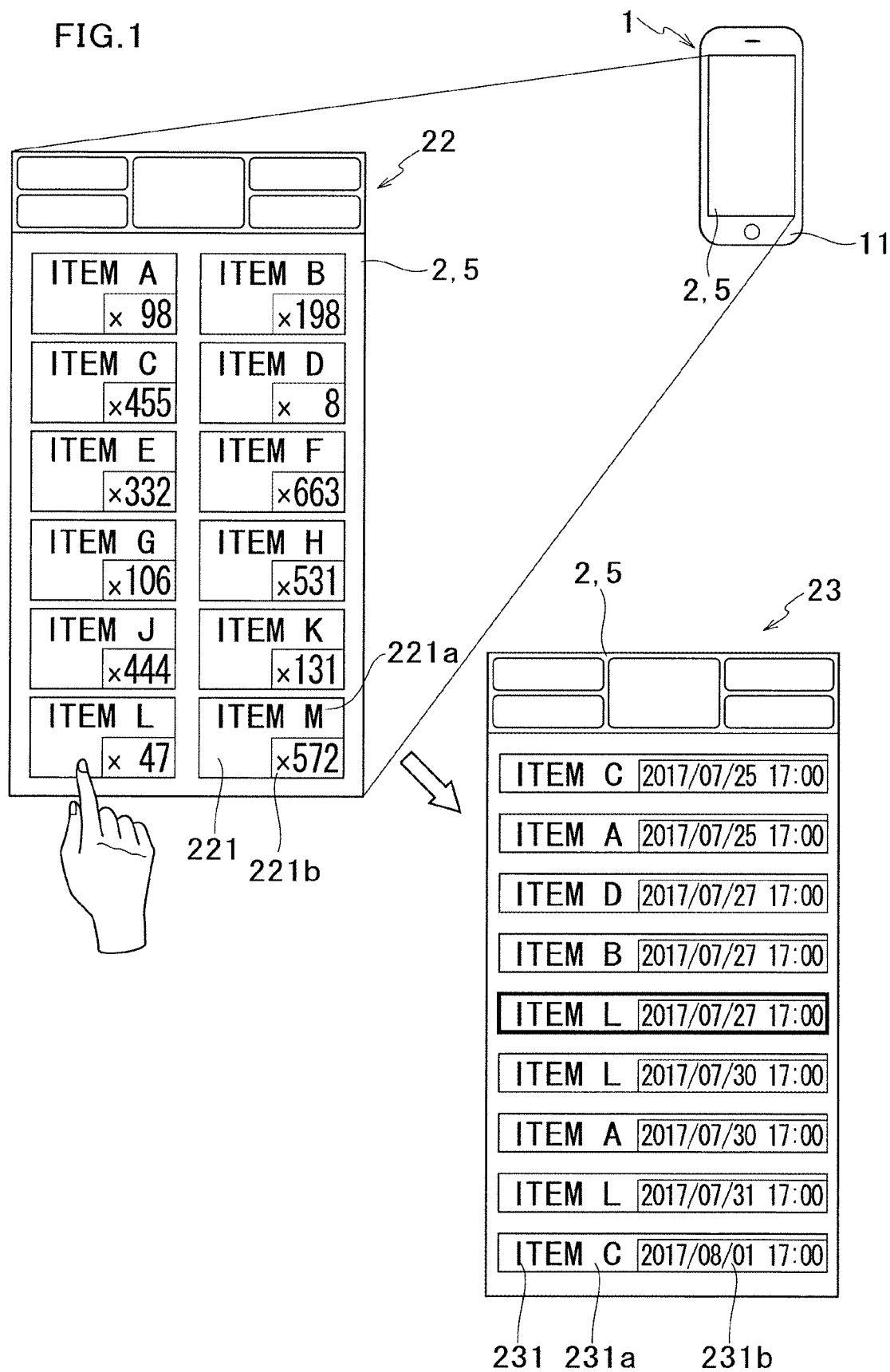
FIG. 1 is an illustrative view showing an operation state of the present invention.

As shown in FIG. 1, the information processor 1 enables the items to be arranged orderly in an order of their expiration dates with a simple operation.

The information processor 1 has a display 2 provided on the front surface of the cabinet 11 and a touch panel 5 provided on an entire surface of the display 2. The information processor 1 may be portable or stand-by. Examples of the portable information processor 1 include portable information devices such as a portable computer, a laptop computer, a notebook computer, a tablet personal computer, a handheld personal computer, a PDA (Personal Data Assistant), and a smart phone.

The display 2 is configured to be able to display images. The display method of the display 2 is, for example, liquid crystal, organic electroluminescence, CRT (Cathode Ray Tube), and plasma. The touch panel 5 is configured to be able to detect the coordinates of the site where the user's finger and the like touch. The touch panel 5 employs the known technique such as the electromagnetic induction method and the electrostatic capacitance method. The information processor 1 determines the object on the screen touched by the user and the touch state such as a swipe based on the coordinates detected by the touch panel 5, and performs a response corresponding to the determination result.

In addition, the touch panel 5 is not limited to being provided on the entire surface of the display 2. For example, the touch panel 5 may also be provided on the back surface of the cabinet 11 opposite to the display 2. In addition, touch panel 5 can also be set in part of the display 2.

In addition, in the following description, when the display 2 is viewed from the front, the lower end direction is referred to as "lower direction" or simply as "lower", the upper end direction is referred to as "upper direction" or simply as "upper", the left end direction is referred to as "left direction" or simply as "left", and the right end direction is referred to as "right direction" or simply as "right".

In addition, in the following description, a selection of an object or a touch operation by the user means that the information processor 1 determines that a certain object is selected for the operation of a user by the touch panel 5.

In addition, in the present embodiment, the touch panel 5 functions as an input unit, receives a swipe input and a touch input, and the like, but it is not limited thereto. For example, as an input unit, it may be a microphone, a camera, or the like, which may receive the user's voice and gesture as an instruction to operate.

As shown in FIG. 1, on the display 2, the first item icons 221 are displayed in a list on the first item display screen 22 for each type of the possessed items by a user. The first item icon 221 is provided with an item name area 221*a* in which a name for identifying a possessed item is displayed and a possessed number area 221b in which the possessed number of the possessed items is displayed. In this way, the first item icons 221 corresponding to the types of the possessed items are displayed in a list correspondingly to the possessed number on the first item display screen 22 displayed on the display 2.

That is, in the first item display screen 22, the specification of the possessed number is displayed for each type of the item, so the user may be motivated to use it since it is easier to obtain than other items.

When the user performs a predetermined operation on the first item icons 221 of the first item display screen 22, the screen displayed on the display 2 is switched from the first item display screen 22 to the second item display screen 23. The second item icons 231 are displayed in a list on the second item display screen 23 for each possessed item by a user. The second item icon 231 is provided with an item name area 231a in which a name for identifying a possessed item is displayed and an expiration date area 231b in which the expiration date of the possessed item is displayed. In this way, the first item display screen 22 is switched to the second item display screen 23 in which second item icons 231 corresponding to the possessed items are displayed in a list correspondingly to the expiration dates when it is determined that an operation received by the touch panel 5 is the predetermined operation.

That is, in the second item display screen 23, the specification of the expiration date is displayed for each item, so the user is motivated to use a possessed item the expiration date of which is near before the expiration date arriving. In addition, the expiration date can be expressed by the date and time as the expiration date, or by the remaining time or remaining days from the current date and time to the expiration date.

As such, the first item icons 221 in which the possessed numbers are associated with the types of the possessed items displayed in the first item display screen 22, and a display is switched to the second item display screen 23 when the predetermined operation is performed, and the second item icons 231 which are associated with the expiration dates of the items are displayed. Therefore, the user is allowed to know the possessed number for each type of the possessed item in the first item display screen, and know the existence of the item that is near the expiration date in the second item display screen 23. As a result, it can improve the user interface associated with the item.

In addition, the second item icons 231 are orderly arranged to display in a list as the order of the expiration dates on the second item display screen 23. Therefore, the user can easily know the item closest to the expiration date.

In the present embodiment, the predetermined operation for switching to the second item display screen 23 is to press the first item icon 221 for a long time, but the present embodiment is not limited thereto, as long as including an operation of designating the first item icon 221. The operation of pressing for a long time refers to touching the object for a duration more than a predetermined time. As such, when the first item display screen 22 is switched to the second item display screen 23 by pressing the first item icon 221 for a long time, the second item icon 231 with the shortest expiration date in the possessed items corresponding to the designated first item icon 221 is displayed in a screen of the display 2. Therefore, the user can easily know the item with the shortest expiration date of the items designated by the user when the second item display screen is displayed.

Figure 2:
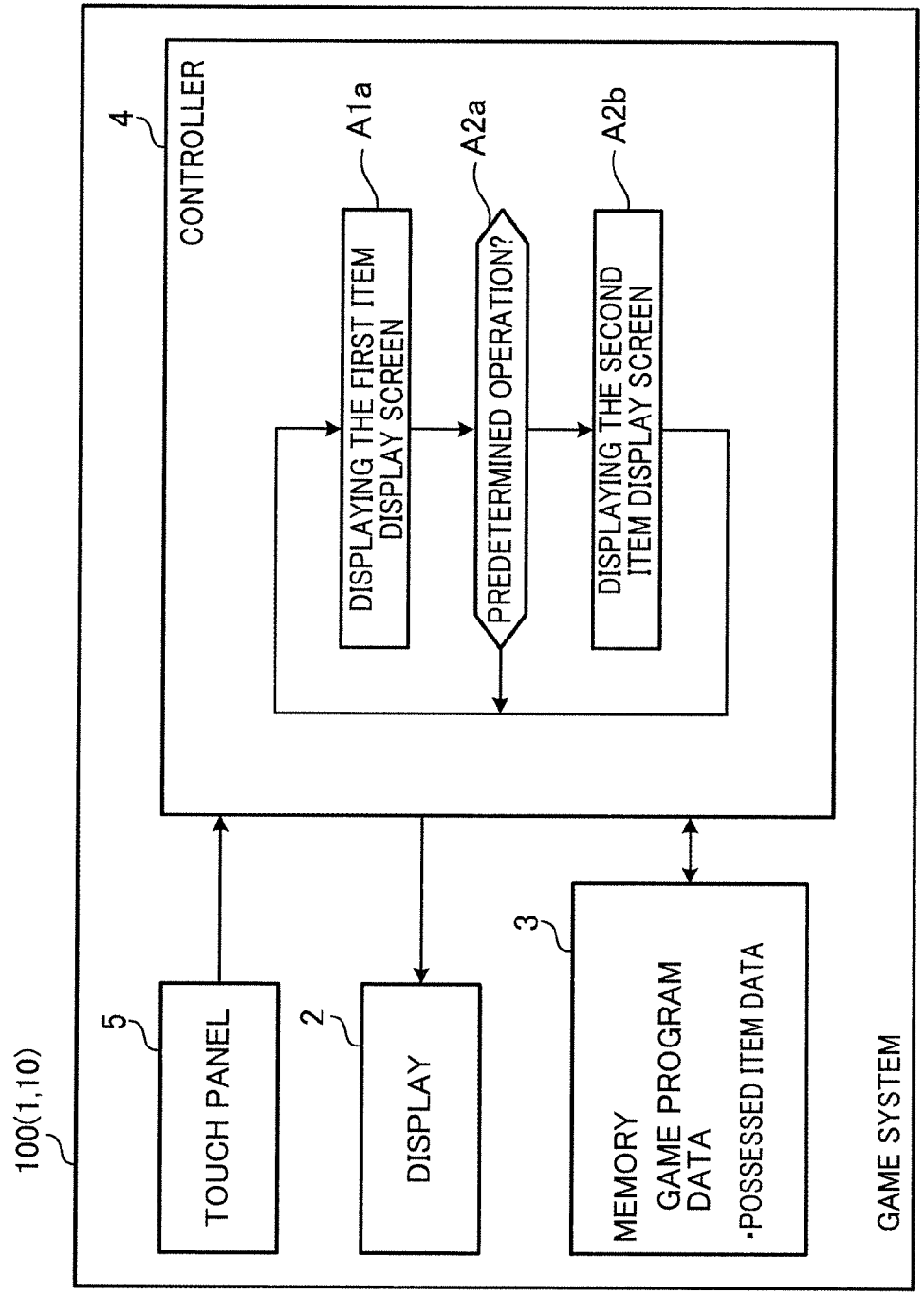
FIG. 2 is an illustrative view showing an schematic configuration of the present invention.

As shown in FIG. 2, a game system 100 having the information processor 1 and a server 10 functions as a computer. In other words, the information processor 1 is connected to the server 10 via a communication line so as to be capable of performing data communication and constitutes a game system 100 having the information processor 1 and the server 10. In addition, the game system 100 is not limited thereto, and it may be configured only by the information processor 1. The information processor 1 includes the display 2, the memory 3, the controller 4, and the touch panel 5.

The display 2 and the touch panel 5 are provided in the information processor 1, and function as an input unit and an output unit of the game system 100, respectively.

The memory 3 stores various programs including a game program executed by the controller 4, and various data used by the various programs. The memory 3 is a conceptual storage area of the game system 100, and it may be included by either the information processor 1 or the server 10. The function of the memory 3 may be distributed in the information processor 1 and the server 10, and alternatively, the function of the memory 3 may be provided to both of the information processor 1 and the server 10. That is, in the game program executed by the information processor 1, the information processor 1 requests the server 10 for data and the server 10 responds to the request for the data when the data to be stored in the server 10 is necessary.

The data and program in the memory 3 may be stored in advance at the stage of factory shipment, or may be downloaded from an unillustrated server or the like via communication means and stored. The communication means may be an interactive communication passage such as the Internet and a cable TV, or may be one-way broadcasting.

Alternatively, the data and program stored in the memory 3 may be stored in a recording medium such as a floppy disk, a CD-ROM, a DVD-ROM, an MO (optical magnetic disc), and a flash memory, and may be read from the recording medium and installed in the memory according to need.

The controller 4 executes various processes in accordance with the game program stored in the memory 3. The controller 4 is a conceptual execution unit of the game system 100, and it may be included by either the information processor 1 or the server 10. The function of the controller 4 may be distributed in the information processor 1 and the server 10, and alternatively, the function of the controller 4 may be provided to both of the information processor 1 and the server 10.

In this manner, the game system 100 functions as a computer having the information processor 1 as the input unit (the touch panel 5) and the output unit (the display 2) and the information processor 1 and/or the server 10 as the memory 3 and the controller 4.

The controller 4 is programmed to perform the following processes. In other words, a game program stored in the memory 3 executes the following processes in the game system 100 which is a computer. To be more specific, the controller 4 executes a process (A1) of displaying on the display 2 the first item display screen 22 in which the first item icons 221 corresponding to the types of the possessed items are displayed in a list correspondingly to the possessed number; a process (A3) of switching from the first item display screen 22 to the second item display screen 23 in which the second item icons 231 corresponding to the possessed items are displayed in a list correspondingly to the expiration dates when it is determined that an operation received by the touch panel 5 is the predetermined operation (A2).

As such, the first item icons 221 in which the possessed numbers are associated with the types of the possessed items displayed in the first item display screen 22, and a display is switched to the second item display screen 23 when the predetermined operation is performed, and the second item icons 231 which are associated with the expiration dates of the items are displayed. Therefore, the user is allowed to know the possessed number for each type of the possessed item in the first item display screen 22, and know the existence of the item that is near the expiration date in the second item display screen 23. As a result, it can improve the user interface associated with the item.

In addition, the game control method in which the processes of (A1) and (A2) are executed by the game system 100 (the information processor 1, or the server 10 and the information processor 1) that is a computer is realized by executing the processes of (A1) and (A2) by the game system 100 (the information processor 1, or the server 10 and the information processor 1) having the above program. In other words, the game system 100 has a plurality of processors that execute the processes of (A1) and (A2), respectively. In addition, in the following description, the information processor 1 will be described, but the processes and actions of the information processor 1 can be replaced with the invention of the program or the game control method. In addition, the process executed by the controller 4 may be executed only by the information processor 1, and functions may be distributed to the information processor 1 and the server 10. That is, the processes and the actions of the information processor 1 can be replaced with the invention of the game system 100 based on the information processor 1 and the server 10.

In addition, the controller 4 may also execute a process in which the second item icons 231 are orderly arranged to display in a list as the order of the expiration dates in the second item display screen 23. Thereby, since the second item icons 231 are orderly arranged on the second item display screen 23 in the order of the expiration dates, the user can easily know the item having the shortest expiration date.

In addition, the controller 4 may also display the second item icon 231 with the shortest expiration date in the possessed items corresponding to the designated first item icon 221 in the screen of the display 2 when switching from the first item display screen 22 to the second item display screen 23. Thereby, the user can easily know the item with the shortest expiration date of the items designated by the user when the second item display screen 23 is displayed by performing an operation of designating a certain first item icon 221 in the first item display screen 22.

(Electric Configuration)

Figure 3:
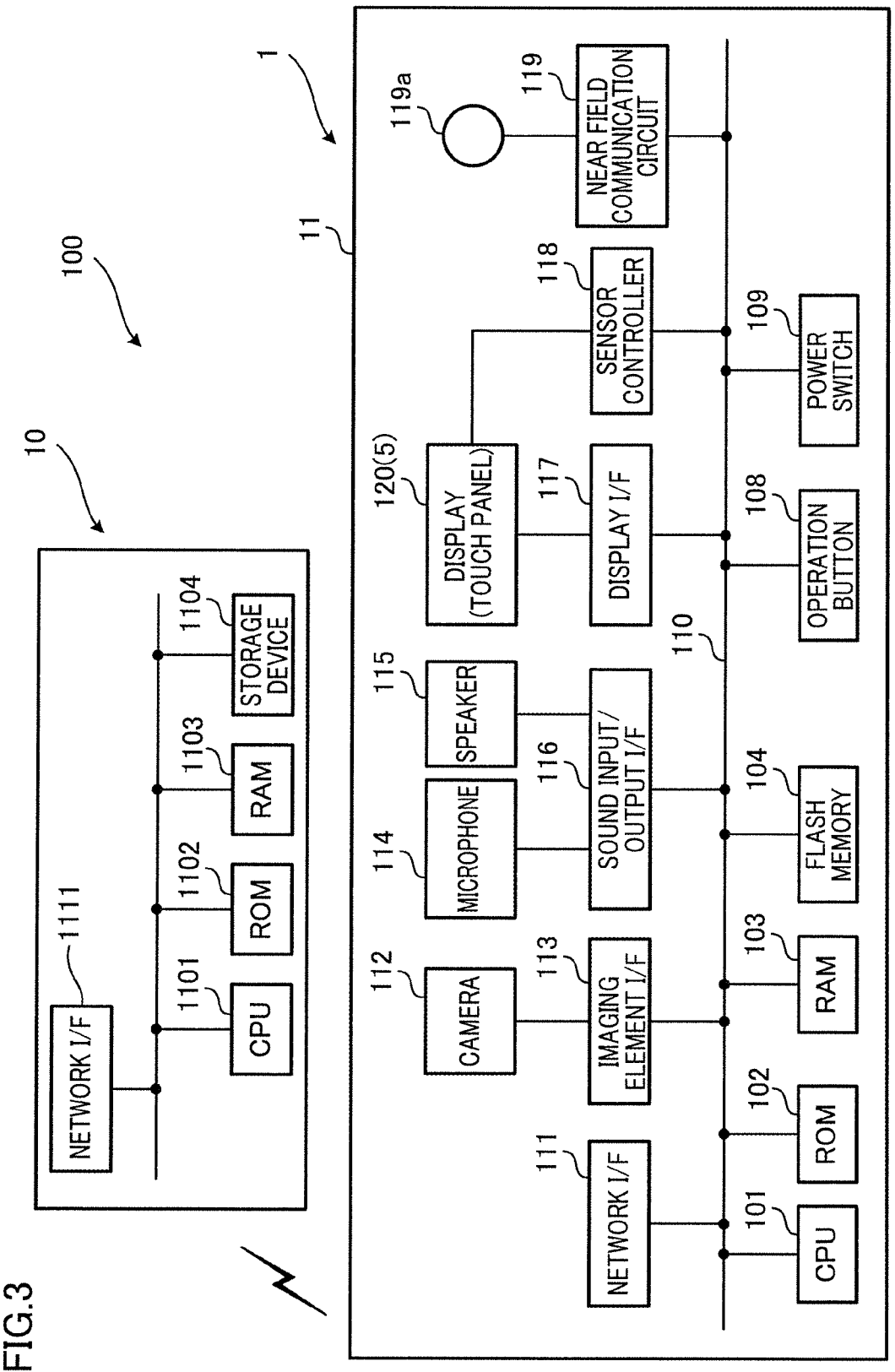
FIG. 3 is a block diagram showing an electric configuration of an information processor.

As shown in FIG. 3, the information processor 1 includes, in a housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

In addition, the server 10 is a so-called computer including a CPU 1101, a ROM 1102, a RAM 1103, a storage device 1104 such as a hard disk drive, and a network I/F 1111.

The CPU (Central Processing Unit) 101 and the CPU 1101 function as the main structure of the controller 4 and control the overall actions of the game system 100. The ROM (Read Only Memory) 102 and the ROM 1102 store programs for the driving of the CPU 101 and the CPU 1101 such as an IPL (Initial Program Loader).

The RAM (Random Access Memory) 103 and the RAM 1103 are used as work areas of the CPU 101 and the CPU 1101. The flash memory 104 stores various data such as a game program, a communication program, image data, and voice data. The operation button 108 is a button that is operated when the information processor 1 is initially set. The power switch 109 is a switch for switching ON/OFF of the power of the information processor 1.

The storage device 1104 functions as a database and stores game data for each of the plurality of information processors 1. The server 10 returns a response with reference to the database of the storage device 1104 as appropriate for the request from the game program of the information processor 1.

The network I/F (Interface) 111 and the network I/F 1111 are interfaces for performing data communication by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphones 114 and between the speakers 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark), Bluetooth (Registered Trademark), or the like. The bus line 110 is an address bus, a data bus, or the like for electrically connecting the components such as the CPU 101.

In the present embodiment, the functions of the memory 3 and the controller 4 are realized by the information processor 1. But it is not limited thereto, the functions of the memory 3 and the controller 4 may also be distributed to the information processor 1 and the server 10. To be more specific, the server 10 may store a data associating the possessed item that is usable in a game and possessed by the user with the expiration date of the possessed item. In this case, the server 10 preferably associates the data with a user ID for identifying the user. The information processor 1 sends a request to the server 10 to update the data which the server 10 has, when the possessed items increase since the user purchases items or the possessed items decrease since the user consumes the possessed items. In addition, when the information processor 1 displays the first item display screen 22 or the second item display screen 23, the data is requested from the server 10.

(Display Screen)

Next, the display screen of the display 2 displayed on the information processor 1 will be specifically described.

Figure 4:
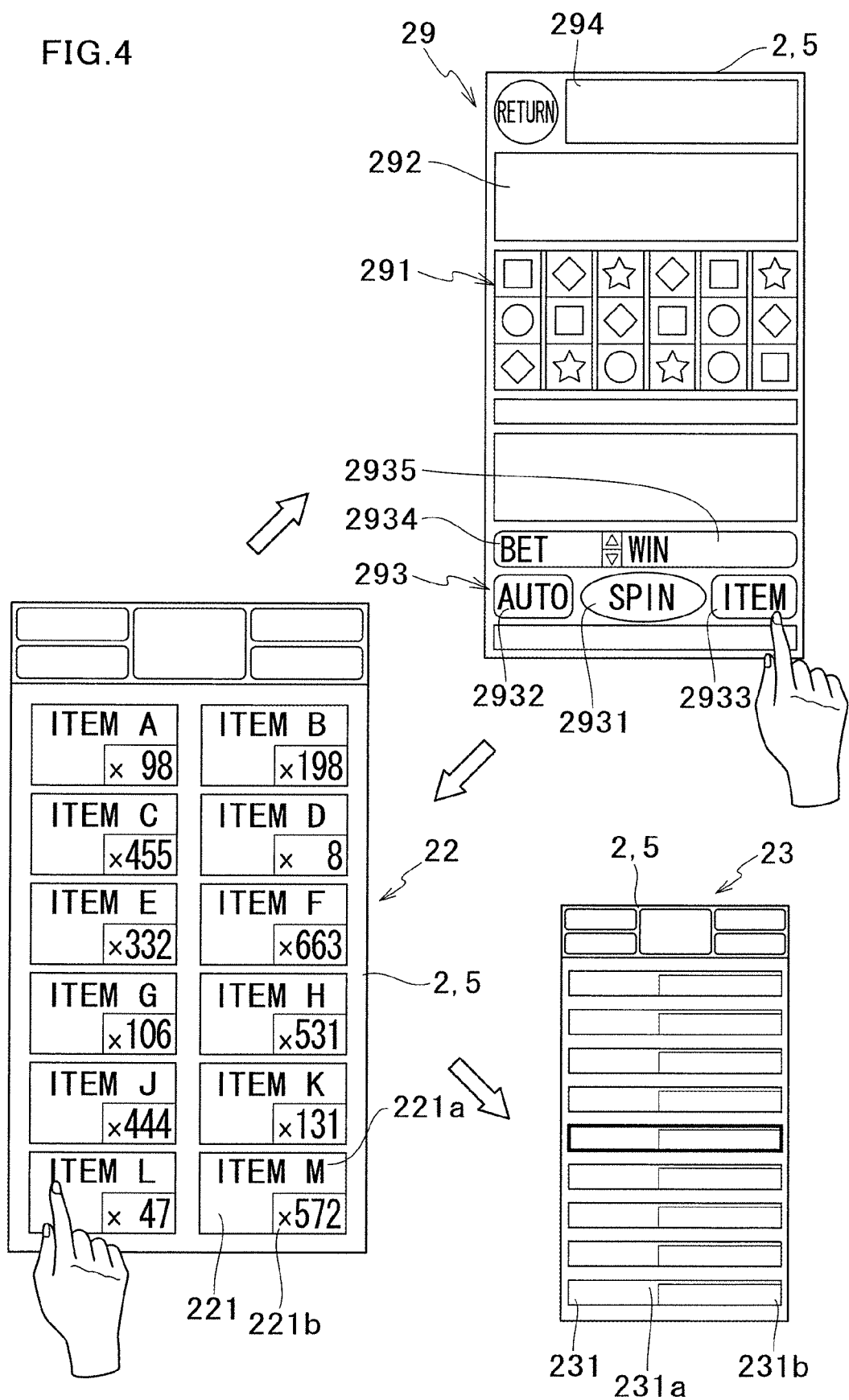
FIG. 4 is a diagram showing an example of a display screen of the information processor.

As shown in FIG. 4, the information processor 1 of the present embodiment has a slot game that is a game element playable in a game. The slot game can be played in a slot game screen 29.

The possessed items possessed by the user are used to facilitate the slot game. For example, the following example is given as an example of the item. That is, there are items which can become the possessed items, i.e., an item in which a random determination probability of a random determination table for determining a game result of the slot game is increased for a predetermined period, an item in which the time related to the slot game for a single time is shortened for a predetermined period, and an item in which a payout amount is increased in a payout table for determining the payout amount based on the game result of the slot game. In addition, the predetermined period may be a time unit or a number of times of the slot game. In addition, the game element is not limited to the slot game, but also a card games such as a poker and a baccarat, a roulette, a pachinko game, a pachislo games and the like.

To be more specific, the slot game screen 29 which is able to run the slot game includes a game area 291 where a plurality of symbol display areas are displayed in an arrangement of a plurality of rows and a plurality of columns, an effect area 292 where moving images and still images such as game characters are displayed with matching to the slot game, an operation area 293 which is operated by the player to progress the game, and a game information display area 294 which displays game contents and game information. The operation area 293 includes a spin button 2931, an AUTO button 2932, an ITEM button 2933, a bet button 2934, and a WIN display portion 2935, which are images.

As described above, on the entire surface of the display 2, a touch panel 5 which allows the game screen to be viewable from the outside is provided. With this arrangement, for example, the slot game (unit game) is executed once, as the image of the spin button 2931 is touch inputted. Furthermore, the slot game is serially executed plural times as the image of the AUTO button 2932 is pressed.

In addition, by pressing the image of the ITEM button 2933, the first item display screen 22 capable of selecting the possessed item to be used is displayed. That is, the first item display screen 22 is a screen displaying the first item icon 221 for which the possessed number corresponds to the type of possessed item possessed by the user, and is a screen used for selecting the possessed item for more favorably running the slot game to adapt to the slot game.

In the first item display screen 22, when one of the first item icons 221 is operated by being touched, one possessed item corresponding to the first item icon 221 is consumed. That is, the numerical value indicated by the possessed number area 221*b* in the first item icon 221 that is the object of the touch operation is decremented by one. Afterwards, in the slot game played by the user, the effect of the possessed item which is consumed is effective in a predetermined period. In addition, in the first item display screen 22, when one of the first item icons 221 is operated by being pressed for a long time, the screen is switched to the second item display screen 23.

Figure 5:
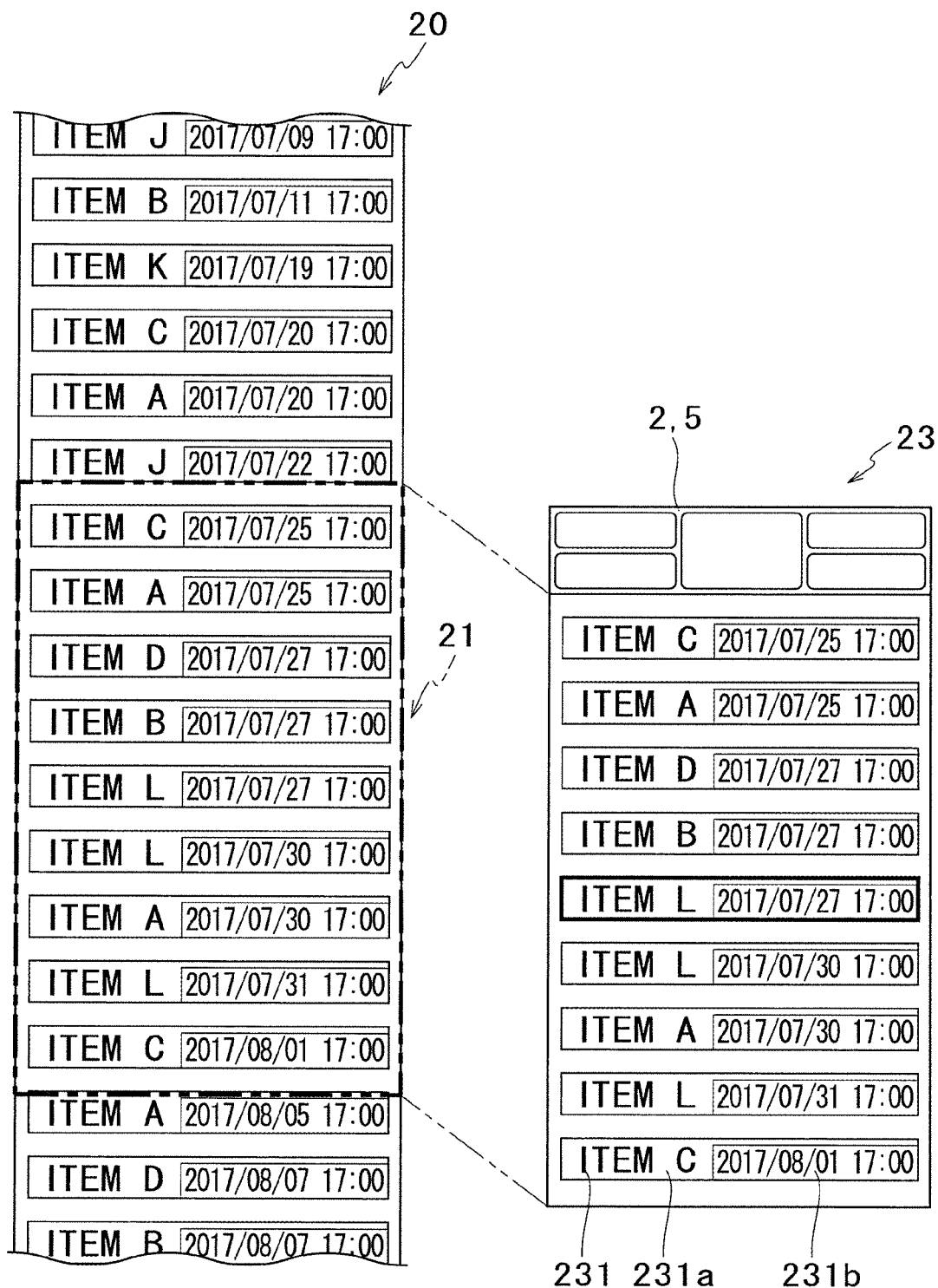
FIG. 5 is a diagram showing an example of a display screen of the information processor.

As shown in FIG. 5, after the first item icon 211 of the first item display screen 22 is operated by being pressed for a long time, and before the screen is switched to the second item display screen 23, a list display data 20 is configured and the a display area 21 is set in the list display data 20. That is, the second item icons 231 included in the range of the list display data 20 shown by the display area 21 are displayed on an initial screen in the second item display screen 23.

The list display data 20 shows the overall arrangement specification of the second item icons 231 displayed in the second item display screen 23. Specifically, the list display data 20 is data showing the arrangement specification in which all the second item icons 231 corresponding to all the possessed items possessed by the user are arranged in a column in the up-down direction. For example, ten second item icons 231 are arranged in the list display data 20 even if all of the ten possessed items are the same type. In addition, it is not limited thereto, in the case where there are possessed items having the same type and the same expiration date, the possessed number may be displayed and collectively expressed with one second item icon 231.

In the list display data 20, the second item icons 231 are orderly arranged as the order of the expiration dates. To be more specific, in the list display data 20, the second item icons 231 are arranged in such a way that the possessed item with the shortest expiration date is at the uppermost and the lower items have later expiration date. That is, the second icon icons 231 are arranged in ascending order as the expiration dates. For example, the second item display screen 23 changes the display area 21 of the list display data 20 by a touch operation such as swiping, and the second item display screen 23 is scroll-displayed. Therefore, by arranging the second item icons 231 in the ascending order as the expiration dates, it is possible to easily confirm the possessed item having a shorter expiration date and the possessed item having a longer expiration date by the scroll-display in the second item display screen 23.

The second item icons 231 displayed in the initial state when the second item display screen 23 is displayed is determined based on the second item icons 231 designated in the first item display screen 22. That is, the first item display screen 22 is displayed after the display area 21 in the list display data 20 is set, based on the first item icons 221 designated in the first item display screen 22.

Specifically, the display area 21 is set in the list display data 20 in such a way that the second item icons 231 of the possessed item with the shortest expiration date in the possessed items determined by the first item icon 221 designated in the first item display screen 22 is set to the center position in the up-down direction. That is, in the second item display screen 23, the decreased date of the item designated by the user is displayed at the center position.

(Data Table)

The data table stored in the information processor 1 will be described.

(Item Information Table)

As shown in FIG. 6, the item information table has an item ID column, an item column, an applicable time column, and an item description column. The item ID is saved in the item ID column, which is an identification number for identifying the item inherently. The name of the item is saved in the item column. The duration of the effect when the item is used is saved in the applicable time column. The description such as the effect with using the item is saved in the item description column.

The item information table is a table used to define the item. For example, when the second item display screen 23 is displayed, a name associated with the item ID of the possessed item management table (see FIG. 7) to be described later is acquired from the item information table and is displayed on the item name area 231*a* in the second item icon 231 of the second item display screen 23. In addition, the description indicating the effect of the item is saved in the item information table, and is referred to when the item details are indicated.

(Possessed Item Management Table)

As shown in FIG. 7, the possessed item management table has a possessed item ID column, an item ID column, and an expiration date column. In the possessed item ID column, the possessed item ID which is an identification number for identifying the possessed item possessed by the user is saved. The item ID is saved in the item ID column. The expiration date of the item is saved in the expiration date column.

The possessed item management table is a data table which contains all of the possessed items possessed by the user as separate data. For example, when the second item display screen 23 is displayed, the expiration date associated with the item ID is acquired from the possessed item management table, and is displayed in the expiration date area 231*b* in the second item icon 231 of the second item display screen 23.

(Used Item Management Table)

As shown in FIG. 8, the used item management table has an item ID column and an applicable date column. The item ID is saved in the item ID column. The applicable date of the item is saved in the applicable date column.

The used item management table is a data table which contains the possessed items used by the user as separate data. For example, in the first item display screen 22, when the possessed item is consumed, the data is deleted from the possessed item management table, and at the same time, the data in which the applicable date is set is added to the used item management table. The applicable date is calculated based on the time for which the possessed item is used and the applicable time set in the item information table (see FIG. 6).

(Slot Game)

Here, a slot game of the present embodiment which can be played in the slot game screen 29 (see FIG. 4) will be described.

(Slot Game: Definitions)

The "base game" in the slot game of the present embodiment is a game in which plural symbols are displayed (arranged) by being varied and stopped in the game area 291, and includes a normal game. A state in which a symbol is displayed after being varied and stopped in the game area 291 is termed "rearrangement" As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A "gaming value" which is awarded when a prize is established as a result of a game result is a coin, paper money, or electrically valuable information corresponding to these. Note that the gaming value in the present invention is not particularly limited. Examples of the gaming value include game media such as medals, tokens, cyber money, tickets, and the like. A ticket is not particularly limited, and a barcoded ticket may be adopted for example. Alternatively, the gaming value may be a game point not including valuable information.

The "free game" is a game which is executable with a smaller amount of gaming values bet than in the normal game. Note that "bet of smaller amounts of gaming values" encompasses a bet of zero gaming value. The "free game" therefore may be a game runnable without a bet of a gaming value, which free game awards an amount of gaming values based on symbols rearranged. In other words, the "free game" may be a game which starts without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 291 is termed "rearrangement" To put it differently, the term "rearrangement" indicates that the symbols are rearranged after the arrangement of the symbols is dismissed. The term "arrangement" indicates a state in which the symbols are visually recognizable by an external player.

(Slot Game: Function Block)

Figure 9:
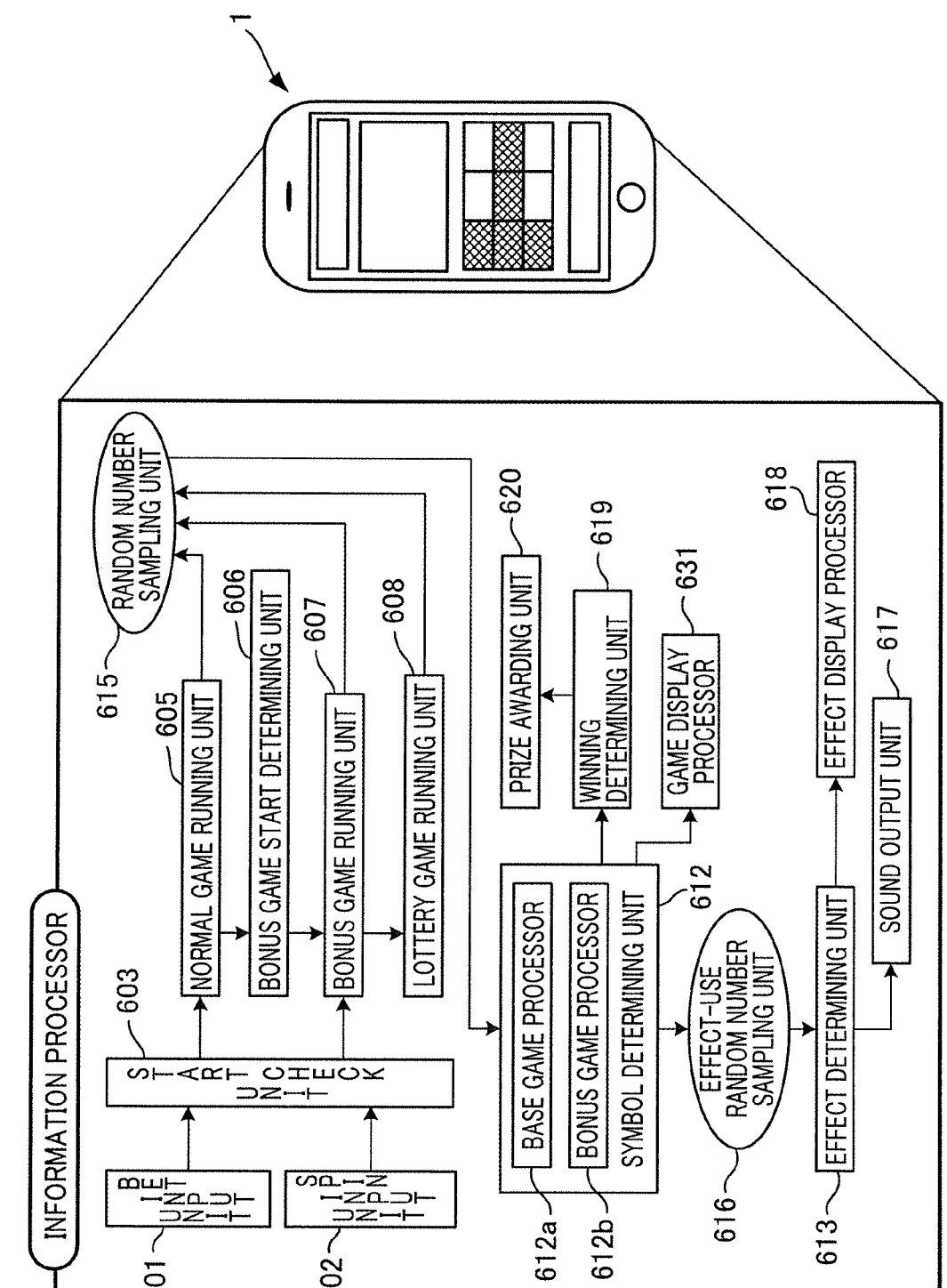
FIG. 9 is a functional block diagram of the information processor.

As shown in FIG. 9, the information processor 1 which is the gaming machine running the slot game has the following functions. To be more specific, the information processor 1 includes a BET input unit 601 and a spin input unit 602. The BET input unit 601 and the spin input unit 602 are input devices. The BET input unit 601 has a function of receiving a bet in response to a user's operation. The spin input unit 602 has a function of receiving a user's operation, i.e., an instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processor 618, a winning determining unit 619, a prize awarding unit 620, and a game display processor 631.

The normal game running unit 605 has a function of running a normal game which is a base game, on condition that the BET input unit 601 is operated. The bonus game start determining unit 606 determines whether to run a bonus game, based on a combination of the symbols rearranged in the normal game. In other words, the bonus game start determining unit 606 has functions of: determining that the player is entitled to a bonus game when a bonus symbol is rearranged; and activating the bonus game running unit 607 so as to run a bonus game from the subsequent unit game. The lottery game running unit 608 has a function of lottery multiple bonuses including the bonus game, and the bonus game can be repeatedly executed after the execution of the bonus game running unit 607.

The symbol determining unit 612 includes a base game processor 612*a* and a bonus game processor 612*b*. The symbol determining unit 612 including these processors 612*a* and 612*b* has functions of: determining symbols to be rearranged based on a random number given from the random number sampling unit 615; rearranging the determined symbols in the game area 291 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has a function of sampling an effect random number when receiving an effect instruction signal from the symbol determining unit 612 and a function of outputting the effect random number to the effect determining unit 613. The effect determining unit 613 has functions of: determining an effect content by using the effect-use random number; outputting image information on the determined effect content to the effect display processor 618; and outputting audio and illumination information of the determined effect content to the sound output unit 617.

The winning determining unit 619 has functions of: determining whether a winning is achieved based on a combination of symbols when information rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of payout out a gaming value to the user.

(Slot Game: Game Contents)

The information processor 1 has three game modes as the slot game, namely the base game mode, the bonus game mode, and the random determination game mode. The base game mode corresponds to the game state in the normal game, and the bonus game mode corresponds to the game state in the free game. In the information processor 1, the unit game is executed with the base game mode as the main unit, and when a bonus trigger condition is satisfied in the base game mode, the information processor 1 shifts to the bonus game mode. The trigger of the bonus game is, for example, a condition in which three or more bonus symbols consecutively appear (are rearranged) from the first reel. The trigger of the bonus game may be another condition.

(Slot Game: Game Contents: Base Game Mode)

The base game mode is specifically described. In the game area 291 displayed on the display 2 shown in FIG. 4, symbols for the slot game are rearrangeable on the video reels with three rows and six columns. In a betting process, a bet amount is selected by the user. The bet amount is, for example, selected from numbers such as 1, 2, 3, 5, and 10 by operating the bet button 2934, and a desired number may be also input. The resource generated by accumulating parts of bet amounts is termed jackpot.

Next, in the game area 291, thereafter, as the symbols are rearranged by varying (scroll-moving) and stopping (scroll-stop) the video reels, the presence or absence of winning is determined. Then, the win determination is performed based on the state of the rearranged symbols. For example, the bonus game trigger is established when the bonus symbols are consecutively rearranged from the first column area (first reel) to the six column area (sixth reel). The bonus game trigger is also established when the bonus symbols and a wild symbol which is able to substitute for the bonus symbol are consecutively rearranged.

(Slot Game: Game Contents: Bonus Game Mode)

The base game mode shifts to the bonus game mode when the trigger condition of the bonus game is established, and a free game process is executed.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the base game. For example, when three or more bonus symbols consecutively appear from the first reel, the retrigger condition of the bonus game (free game) is established.

Then, it is determined whether a free game ends or not, and if the free game does not end, the free game continues, and the remaining free games are performed.

(Information Processor 1: Actions)

Next, a game program executed by the CPU 101 of the information processor 1 will be described.

(Slot Game Screen Process)

Figure 10:
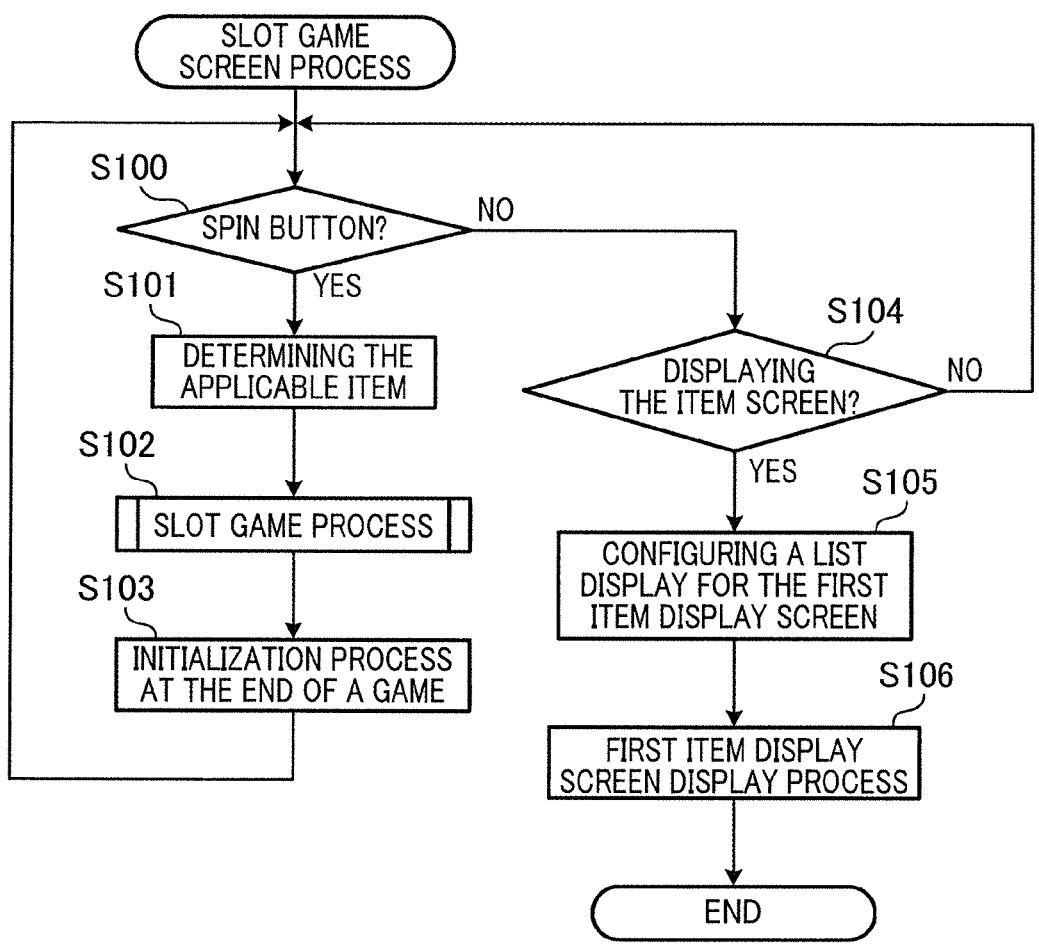
FIG. 10 is a flowchart of a slot game screen process.

The slot game screen process will be described with reference to FIG. 10. The slot game screen process is a process executed on the basis of an operation from the user in the slot game screen 29 shown in FIG. 4.

First, the CPU 101 determines whether the spin button 2931 in the slot game screen 29 is operated by being touched (S100). When it is determined that the spin button 2931 is operated (S100: YES), the CPU 101 determines to apply the item (S101). Specifically, the CPU 101 determines the touch operation timing at which the spin button is operated by being touched, the application of the item corresponding to the item ID for which the touch operation timing does not exceed the applicable date is determined referring to the used item management table (see FIG. 8). In addition, the CPU 101 deletes data of the item ID whose touch operation timing exceeds the applicable date from the used item management table.

After that, the CPU 101 executes the slot game process (S102). The slot game process will be described later. Then, the CPU 101 executes an initialization process when a game ends (S103) and turns the process to step S100. The CPU 101 clears, for example, the bet amount, the symbols determined by the lottery, and the like from the work area of the RAM 103 for each game as unnecessary data in the initialization process when a game ends.

When it is determined in step S100 that the spin button is not touched (S100: NO), the CPU 101 determines whether there is a request to display the item screen by touching the ITEM button 2933 (S104). When it is determined that there is no request to display the item screen (S104: NO), the CPU 101 turns the process to step S100.

On the other hand, when there is a request to display the item screen (S104: YES), the CPU 101 configures the list display data for displaying the first item display screen 22 (S105). Specifically, based on the possessed item management table (see FIG. 7), the CPU 101 calculates the possessed number for each type of the possessed item, obtains the name of the possessed item corresponding to the item ID from the item information table (see FIG. 6), and configures information to be displayed on the first item display screen 22 from data in which the name of the possessed item and the possession number are associated with each other. In addition, at this time, the data of the possessed item whose expiration date has passed may be deleted from the possessed item management table (see FIG. 7). Then, the CPU 101 displays the first item display screen 22 based on the configured information (S106), and ends the present routine.

(First Item Display Screen Process)

Figure 11:
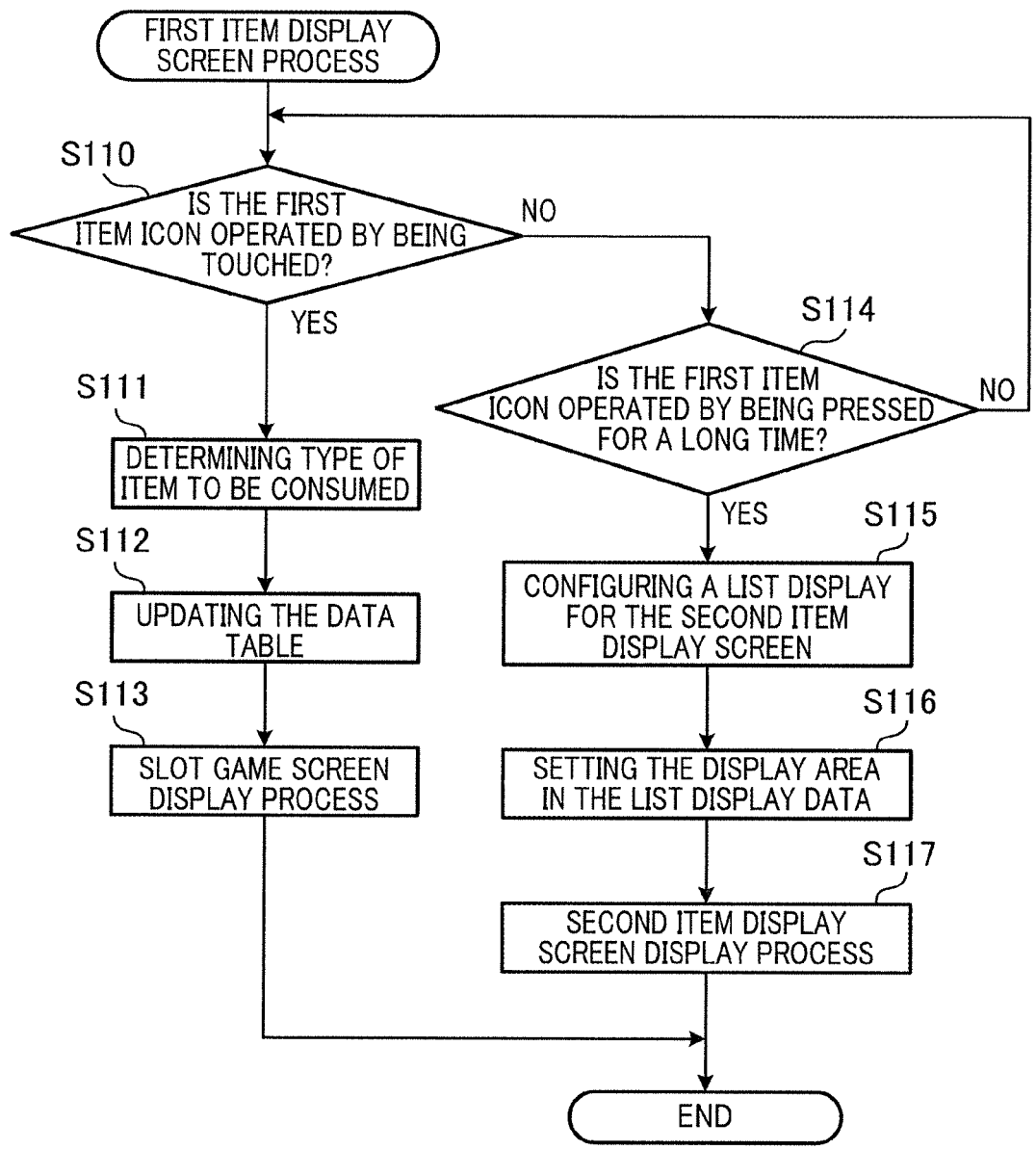
FIG. 11 is a flowchart of a first item display screen process.

With reference to FIG. 11, the first item display screen process will be described. The first item display screen process is a process executed in the first item display screen 22 shown in FIG. 4 based on an operation from the user.

First, the CPU 101 determines whether or not the first item icon 221 is operated by being touched (S110).

When it is determined that the first item icon 221 is operated by being touched (S110: YES), the CPU 101 determines the type of the possessed item to be consumed based on the first item icon 221 that is the object of the touch operation (S111).

Thereafter, the CPU 101 updates the data table (S112). Specifically, in the possessed item management table (see FIG. 7), the CPU 101 deletes the data of the possessed item whose type is determined and whose expiration date is shortest. In addition, at this time, the data of the possessed item whose expiration date has passed may be deleted from the possessed item management table (see FIG. 7). Further, the CPU 101 adds data in which the item ID of the data and the applicable date are associated with each other into the used item management table (see FIG. 8).

Thereafter, the CPU 101 displays the slot game screen 29 (S113), and ends this routine.

In addition, when it is determined in step S110 that the first item icon 221 is not operated by being touched (S110: NO), the CPU 101 determines whether the first item icon 221 is operated by being pressed for a long time (S114). When it is determined that the first item icon 221 is not operated by being pressed for a long time (S114: NO), the CPU 101 turns the process to step S110.

On the other hand, when it is determined that the first item icon 221 is operated by being pressed for a long time (S114: YES), the CPU 101 configures the list display data 20 (see FIG. 5) for displaying the second item display screen 23 (S115). Then, the CPU 101 sets the display area 21 in the configured list display data 20. Thereafter, the CPU 101 displays the second item display screen 23 on the basis of the list display data 20 in which the display area 21 is set (S117), and ends this routine.

In addition, although the process executed based on the operation from the user in the second item display screen 23 is not shown, as the second item icon 231 is operated by being touched, the CPU 101 performs the same processes as the steps S111 to S113 of the first item display screen process (see FIG. 11). In addition, when the second item icon 231 is operated by being pressed for a long time, the CPU 101 may also execute the processes of the steps S105 and S106 of the slot game screen process (see FIG. 10) to display the first item display screen 22.

(Information Processor 1: Slot Game Process)

Next, a game program of a slot game process executed by the CPU 101 of the information processor 1 will be described with reference to FIG. 12. The slot game process is a process executed in step S102 in the slot game screen process (see FIG. 10).

Figure 12:
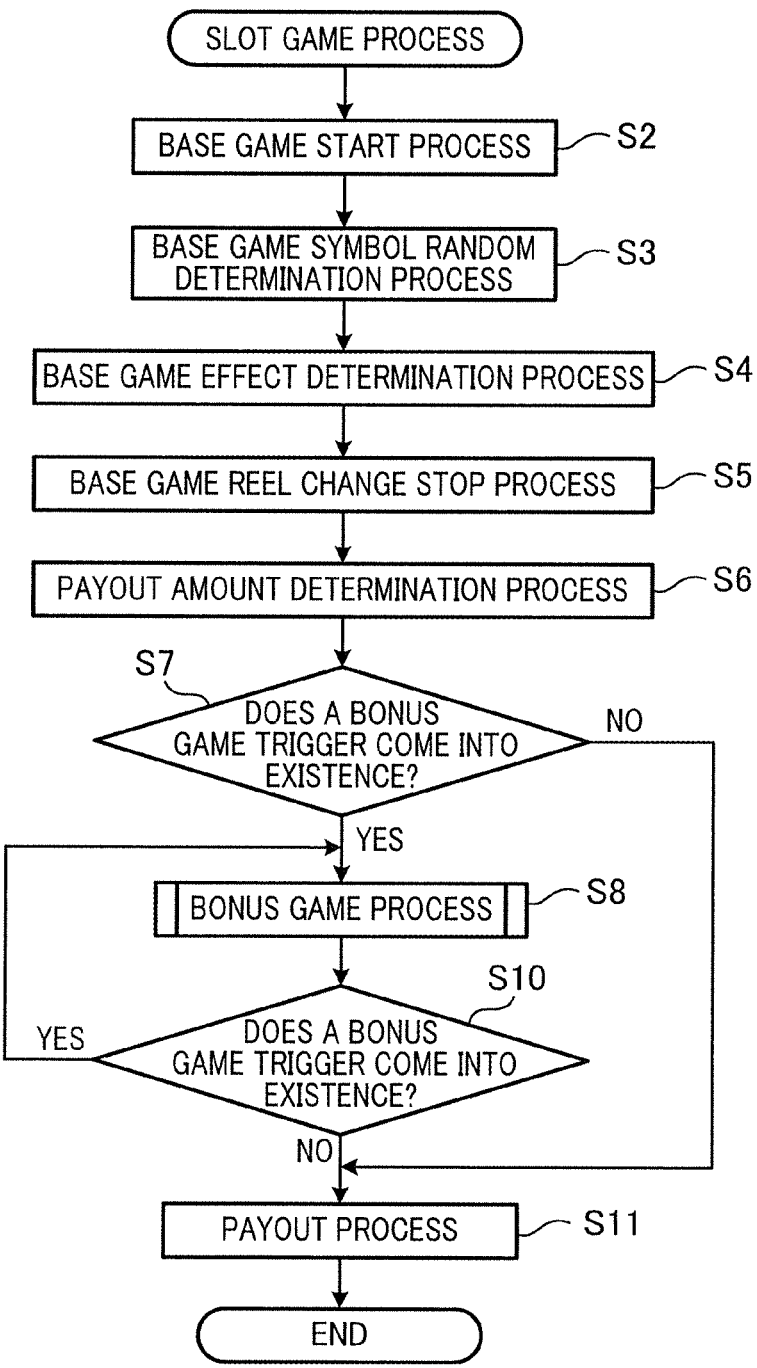
FIG. 12 is a flowchart of a slot game process.

As shown in FIG. 12, after a base game start process (S2), a base symbol random determination process is executed (S3). In this process, to-be-stopped symbols are randomly selected and determined based on a random number by using a random determination table.

Then a base game effect determination process is executed (S4). The CPU 101 samples an effect-use random number and randomly determines any of a plurality of predetermined effect contents, and executes the determined effect content at the determined timing. For example, an effect image is displayed in an effect area 292 of the display 2, and sound is output by the speaker 115.

Then a base game reel variation stop process is executed (S5). In this process, the scroll of the symbol columns in the symbol display area 21a starts, and the to-be-stopped symbols determined in the base game symbol random determination process are stopped at predetermined positions.

Then a payout amount determination process is executed (S6). In the base game, a payout amount is determined in accordance with a combination of symbols and based on a payout table, and the determined payout amount is stored in a payout amount storage area of the RAM 103. When the bonus game trigger is established, a payout amount is determined in accordance with a combination of bonus symbols, based on a rule different from the rule in the base game.

Then whether the bonus game trigger has been established is determined (S7). When the bonus game trigger has been established (YES in S7), a bonus game process is executed (S8).When the bonus game trigger has been established (YES in S10), the bonus game process in S8 is executed again.

In the meanwhile, if the bonus game trigger has not been established in S7 or S10 (NO in S7 or S10), a payout process is executed (S11). The CPU 101 adds a value stored in the payout amount storage area to a value stored in a credit amount storage area (credit counter) provided in the RAM 103. Thereafter, this routine is ended and the process returns to the slot game screen process (see FIG. 10).

(Information Processor 1: Bonus Game Process)

Figure 13:
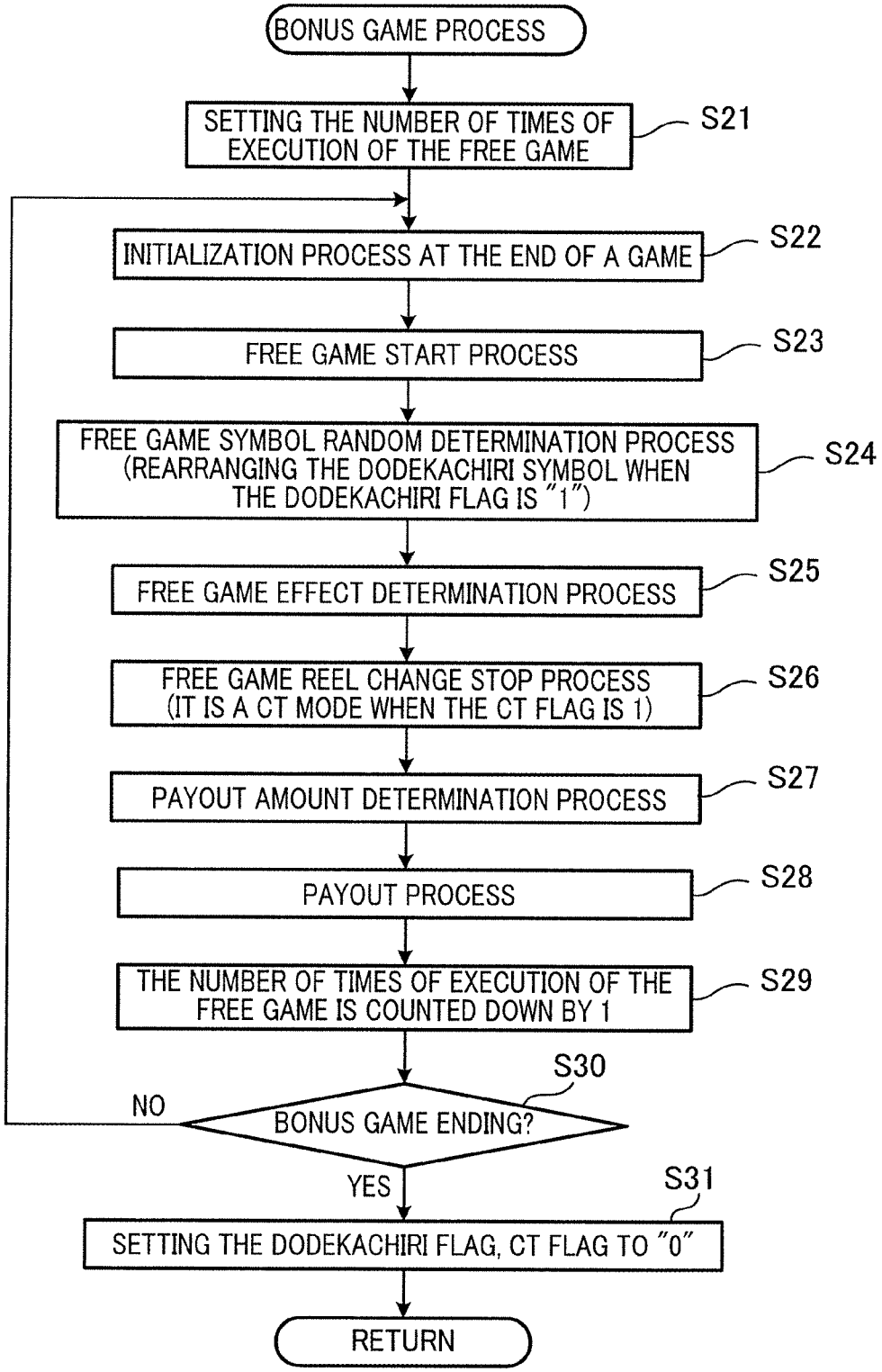
FIG. 13 is a flowchart of a bonus game process.

Next, with reference to FIG. 13, a game program of a bonus game process which is a subroutine of the slot game process executed by the CPU 101 of the information processor 1 will be described.

To begin with, the number of times of execution of the free game is set (S21). For example, the number of times of execution of the free game is set at 5. Then an initializing process at the end of each play of the game is executed (S22). For example, this process clears data in a working area of the RAM 103, which becomes unnecessary at the end of each play of game, e.g., the symbols selected by random determination. It is noted that the bet amount in the bonus game is identical with the bet amount in the base game immediately before the shift to the bonus game.

Thereafter, in the same manner as in the base game, a free game start process (S23), a symbol random determination process (S24), and a free game effect determination process (S25) are executed. In the free game, a free game symbol random determination table different from the symbol random determination table in the base game is used. In the free game symbol random determination process, when a Dodekachiri flag is set at 1, random determination is executed such that a Dodekachiri symbol is to be rearranged.

Thereafter, a free game reel variation stop process (S26) is executed to vary and stop the reels. In this process, the free game is shifted to a CT mode when a CT flag is set at 1. In this mode, the user is allowed to forcibly stop the reels by an operation. Thereafter, a payout amount determination process (S27) and a payout process (S28) are serially executed, and then the number of times of execution of the free game is counted down by 1 (S29). Then whether the bonus game has ended is determined (S30). When the number of times of execution of the free game is not 0 (NO in S30), the steps are executed again from S22 as it is determined that the bonus game has not ended. In the meanwhile, when the number of times of execution of the free game is 0 (YES in S30), it is determined that the bonus game has ended. Then the Dodekachiri flag and the CT flag are set at 0 (S31). As such, the flags are maintained at 0 in the bonus game after the base game, and the flags are changed from 1 to 0 in the bonus game after the random determination game. The process is then terminated and the processing routine shown in FIG. 13 is resumed.

(Summary of the Invention)

The information processor 1 comprises a display 2 for displaying a screen, a touch panel 5 for receiving a touch operation of a user, a memory 3 for storing possessed items that are usable in a game and possessed by the user in association with expiration dates of the possessed items, and a controller 4 which is programmed to execute a process of displaying on the display 2 the first item display screen 22 in which the first item icons 221 corresponding to the types of the possessed items are displayed in a list correspondingly to the possessed number; a process of switching from the first item display screen 22 to the second item display screen 23 in which the second item icons 231 corresponding to the possessed items are displayed in a list correspondingly to the expiration dates when it is determined that an operation received by the touch panel 5 is the predetermined operation.

Generally, the motivation for the user to use the possessed item is to use the item because it is easier to obtain than the other possessed item to possess a large amount, and to use the item the expiration date of which is near before the expiration date arriving. According to the configuration mentioned above, the first item icons 221 in which the possessed numbers are associated with the types of the possessed items are displayed in the first item display screen 22, and a display is switched to the second item display screen 23 when the predetermined operation is performed, and the second item icons 231 which are associated with the expiration dates of the items are displayed. Therefore, the user is allowed to know the possessed number for each type of the possessed item in the first item display screen, and know the existence of the item that is near the expiration date in the second item display screen 23. As a result, it can improve the user interface associated with the item.

In the information processor 1, the controller 4 is programmed to execute a process in which the second item icons 231 are orderly arranged to display in a list as the order of the expiration dates in the second item display screen 23.

According to the configuration mentioned above, since the second item icons 231 are orderly arranged on the second item display screen 23 in the order of the expiration dates, the user can easily know the item having the shortest expiration date.

In the information processor 1, the touch panel 5 is provided on the entire surface of the display 2, and the predetermined operation includes an operation of designating any one of the first item icons 221, and when the first item display screen 22 is switched to the second item display screen 23, the controller 4 displays the second item icon 231 with the shortest expiration date in the possessed items corresponding to the designated first item icon 221 in a screen of the display 2.

According to the configuration mentioned above, the user can easily know the item with the shortest expiration date of the items designated by the user when the second item display screen 23 is displayed by performing an operation of designating a certain first item icon 221 in the first item display screen 22.

The game program causes a computer which includes a display 2 for displaying a screen, a touch panel 5 for receiving a touch operation of a user, and a memory 3 for storing possessed items that are usable in a game and possessed by the user in association with expiration dates of the possessed items to execute a process of displaying on the display 2 the first item display screen 22 in which the first item icons 221 corresponding to the types of the possessed items are displayed in a list correspondingly to the possessed number; a process of switching from the first item display screen 22 to the second item display screen 23 in which the second item icons 231 corresponding to the possessed items are displayed in a list correspondingly to the expiration dates when it is determined that an operation received by the touch panel 5 is the predetermined operation.

According to the configuration mentioned above, the first item icons 221 associated with the possessed number are displayed in the first item display screen 22 as the types of the possessed items, and a display is switched to the second item display screen 23 when the predetermined operation is performed, and the second item icons 231 which are associated with the expiration dates of the items are displayed. Therefore, the user is allowed to know the possessed number for each type of the possessed item in the first item display screen, and know the existence of the item that is near the expiration date in the second item display screen 23. As a result, it can improve the user interface associated with the item.

The game control method executed by a computer which includes a display 2 for displaying a screen, a touch panel 5 for receiving a touch operation of a user, and a memory 3 for storing possessed items that are usable in a game and possessed by the user in association with expiration dates of the possessed items, causing the computer to execute a process of displaying on the display 2 the first item display screen 22 in which the first item icons 221 corresponding to the types of the possessed items are displayed in a list correspondingly to the possessed number; a process of switching from the first item display screen 22 to the second item display screen 23 in which the second item icons 231 corresponding to the possessed items are displayed in a list correspondingly to the expiration dates when it is determined that an operation received by the touch panel 5 is the predetermined operation.

According to the configuration mentioned above, the first item icons 221 associated with the possessed number are displayed in the first item display screen 22 as the types of the possessed items, and a display is switched to the second item display screen 23 when the predetermined operation is performed, and the second item icons 231 which are associated with the expiration dates of the items are displayed. Therefore, the user is allowed to know the possessed number for each type of the possessed item in the first item display screen, and know the existence of the item that is near the expiration date in the second item display screen 23. As a result, it can improve the user interface associated with the item.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

In addition, in the above detailed description, for the sake of easier understanding of the present invention, a description has been given focusing on the characteristic part. The present invention is not limited to the embodiment described in the detailed description above, but may be applied to other embodiments, and the applicable range is various. In addition, terms and phraseology used in the present specification are used to clearly describe present invention and are not intended to limit the explanation of present invention. In addition, other configurations, systems, methods, and the like included in the concept of the present invention can be easily derived from the concept of the invention described in the present specification as long as it is a person skilled in the art. Therefore, the description of the claims must be regarded as including equivalent structures without departing from the range of the technical idea of the present invention. In addition, the abstract is intended to allow those skilled in the art, such as in the patent offices and general public offices, who know a little about the legal terms or the professional term and the like, to determine the technical content of the present application and the nature thereof rapidly though a simple search. Accordingly, the abstract is not intended to limit the scope of the invention as evaluated by the claims. In addition, in order to fully understand the purpose of the present invention and the specific effects of the present invention, it is desirable to make full reference and explanation of the already-disclosed document and the like.

The above detailed description includes a process performed by the computer. The above description and the present invention have been written for the purpose of enabling those skilled in the art to understand most effectively. In the present specification, each process used to derive a result should be understood as processes which are not self-contradictory. In addition, in each process, electric or electromagnetic signals are received, transmitted, recorded, or the like. In the processing of each process, such signal is expressed by bit, value, symbol, word, term, number, and the like, but it should be noted that it is used only for the convenience of illustration. In addition, in the processing of each process, there is a case which is described by a common expression with human actions, however, the processes described in this specification are executed in principle by various devices. In addition, the other structure required for performing each process can be clarified by the above description.

What is claimed is:

1. An information processor, comprising:
a display for displaying a screen;
an input device for receiving an operation of a user;
a memory for storing possessed items that are usable in a game and possessed by the user in association with expiration dates of the possessed items; and
a controller,
the controller being programmed to execute:
a process of displaying on the display a first item display screen in which first item icons corresponding to types of the possessed items are displayed in a list, each of the first item icons being displayed together with a possessed number of the possessed items of the corresponding type;
a process of switching from the first item display screen to a second item display screen in which second item icons corresponding to the possessed items are displayed in a list when a first operation of designating any one of the first item icons is received by the input device, each of the second item icons being displayed together with the expiration date of the corresponding possessed item;
a process of executing a game that responds to a user input received via the input device and displays a game screen on the display;
a process of, in a case of receiving via the input device a second operation that designates any one of the first item icons and is different from the first operation when the first item display screen is displayed on the display, using in the game the possessed item corresponding to the first item icon designated by the second operation; and
a process of, in a case of receiving via the input device a third operation that designates any one of the second item icons when the second item display screen is displayed on the display, using in the game the possessed item corresponding to the second item icon designated by the third operation,
wherein the process of switching from the first item display screen the second item display screen comprises:
a process of displaying the second item icon with a shortest expiration date in the possessed items of the type corresponding to the designated first item icon in a screen of the display; and
a process of arranging the second item icons, which have expiration dates closest to the shortest expiration date regardless of the types of the possessed items corresponding to the second item icons, in an order of expiration dates, and
wherein the controller is programmed to further execute:
a process of generating a list display data in which the second item icons are arranged in the order of expiration dates;
when the first item display screen is switched to the second item display screen, a process of setting a display area of the list display data based on the first item icon designated by the first operation in the first item display screen; and
a process of displaying the second item icons included in a range set by the display area in the list display data as an initial screen of the second item display screen, wherein the second item icons which are not included in the range set by the display area in the list display data are not displayed as the initial screen.

2. The information processor according to claim 1, wherein the input device is provided on an entire surface of the display.

3. The information processor according to claim 1, wherein the process of arranging the second item icons comprises:
a process of displaying the second item icon with a later expiration date which is closest to the shortest expiration date, at a position which is adjacent to the second item icon with the shortest expiration date in a first direction; and
a process of displaying the second item icon with an earlier expiration date which is closest to the shortest expiration date, at a position which is adjacent to the second item icon with the shortest expiration date in a second direction opposite to the first direction.

4. The information processor according to claim 1, wherein the controller is programmed to further execute, when the second item display screen is displayed, a process of changing the second item display screen by changing the display area of the list display data based on an operation of the user via the input device.

5. A non-transitory computer-readable medium storing a game program for causing a computer which comprises a display for displaying a screen, an input device for receiving an operation of a user, and a memory for storing possessed items that are usable in a game and possessed by the user in association with expiration dates of the possessed items to execute:
a process of displaying on the display a first item display screen in which first item icons corresponding to types of the possessed items are displayed in a list, each of the first item icons being displayed together with a possessed number of the possessed items of the corresponding type;
a process of switching from the first item display screen to a second item display screen in which second item icons corresponding to the possessed items are displayed in a list when a first operation of designating any one of the first item icons is received by the input device, each of the second item icons being displayed together with the expiration date of the corresponding possessed item;

a process of executing a game that responds to a user input received via the input device and displays a game screen on the display;

a process of, in a case of receiving via the input device a second operation that designates any one of the first item icons and is different from the first operation when the first item display screen is displayed on the display, using in the game the possessed item corresponding to the first item icon designated by the second operation; and a process of, in a case of receiving via the input device a third operation that designates any one of the second item icons when the second item display screen is displayed on the display, using in the game the possessed item corresponding to the second item icon designated by the third operation, wherein the process of switching from the first item display screen the second item display screen comprises:

a process of displaying the second item icon with a shortest expiration date in the possessed items of the type corresponding to the designated first item icon in a screen of the display; and a process of arranging the second item icons, which have expiration dates closest to the shortest expiration date regardless of the types of the possessed items corresponding to the second item icons, in an order of expiration dates;

wherein the game program causes the computer to further execute:

a process of generating a list display data in which the second item icons are arranged in the order of expiration dates;

when the first item display screen is switched to the second item display screen, a process of setting a display area of the list display data based on the first item icon designated by the first operation in the first item display screen; and a process of displaying the second item icons included in a range set by the display area in the list display data as an initial screen of the second item display screen, wherein the second item icons which are not included in the range set by the display area in the list display data are not displayed as the initial screen.

6. The non-transitory computer-readable medium according to claim 5, wherein the input device is provided on an entire surface of the display.

7. The non-transitory computer-readable medium according to claim 5, wherein the process of arranging the second item icons comprises:

a process of displaying the second item icon with a later expiration date which is closest to the shortest expiration date, at a position which is adjacent to the second item icon with the shortest expiration date in a first direction; and a process of displaying the second item icon with an earlier expiration date which is closest to the shortest expiration date, at a position which is adjacent to the second item icon with the shortest expiration date in a second direction opposite to the first direction.

8. The information processor according to claim 5, wherein the game program causes the computer to further execute, when the second item display screen is displayed, a process of changing the second item display screen by changing the display area of the list display data based on an operation of the user via the input device.

9. A game control method executed by a computer which comprises a display for displaying a screen, an input device for receiving an operation of a user, and a memory for storing possessed items that are usable in a game and possessed by the user in association with expiration dates of the possessed items, the game control method comprising the steps of:

displaying on the display a first item display screen in which first item icons corresponding to types of the possessed items are displayed in a list, each of the first item icons being displayed together with a possessed number of the possessed items of the corresponding type;

switching from the first item display screen to a second item display screen in which second item icons corresponding to the possessed items are displayed in a list correspondingly to the expiration dates when a first operation of designating any one of the first item icons is received by the input device, each of the second item icons being displayed together with the expiration date of the corresponding possessed item, a process of executing a game that responds to a user input received via the input device and displays a game screen on the display;

a process of, in a case of receiving via the input device a second operation that designates any one of the first item icons and is different from the first operation when the first item display screen is displayed on the display, using in the game the possessed item corresponding to the first item icon designated by the second operation; and a process of, in a case of receiving via the input device a third operation that designates any one of the second item icons when the second item display screen is displayed on the display, using in the game the possessed item corresponding to the second item icon designated by the third operation, wherein switching from the first item display screen the second item display screen comprises:

displaying the second item icon with a shortest expiration date in the possessed items of the type corresponding to the designated first item icon in a screen of the display; and arranging the second item icons, which have expiration dates closest to the shortest expiration date regardless of the types of the possessed items corresponding to the second item icons, in an order of expiration dates;

wherein the game control method further comprises:

generating a list display data in which the second item icons are arranged in the order of expiration dates;

when the first item display screen is switched to the second item display screen, setting a display area of the list display data based on the first item icon designated by the first operation in the first item display screen; and displaying the second item icons included in a range set by the display area in the list display data as an initial screen of the second item display screen, wherein the second item icons which are not included in the range set by the display area in the list display data are not displayed as the initial screen.

10. The game control method according to claim 9, wherein, the input device is provided on an entire surface of the display.

11. The game control method according to claim 9, wherein arranging the second item icons comprises:
    displaying the second item icon with a later expiration date which is closest to the shortest expiration date, at a position which is adjacent to the second item icon with the shortest expiration date in a first direction; and
    displaying the second item icon with an earlier expiration date which is closest to the shortest expiration date, at a position which is adjacent to the second item icon with the shortest expiration date in a second direction opposite to the first direction.

12. The game control method according to claim 9, further comprising, when the second item display screen is displayed, changing the second item display screen by changing the display area of the list display data based on an operation of the user via the input device.

13. A non-transitory computer-readable medium storing a game program for causing a computer which comprises a display for displaying a screen, an input device for receiving an operation of a user, and a memory for storing possessed items that are usable in a game and possessed by the user in association with expiration dates of the possessed items to execute:
    a process of displaying on the display a first item display screen in which first item icons corresponding to types of the possessed items are displayed in a list;
    a process of, when determining that the operation received by the input device is a first operation of continuously touching any one of the first item icons for a predetermined time or more, switching from the first item display screen to a second item display screen to display and arrange the second item icon corresponding to the possessed item of the first item icon selected by the first operation and the second item icons corresponding to the possessed items which have expiration dates closest to the expiration date of the possessed item of the first item icon selected by the operation regardless of the types of the possessed items corresponding to the second item icons, in an order of expiration dates;
    a process of executing a game that responds to a user input received via the input device and displays a game screen on the display;
    a process of, in a case of receiving via the input device a second operation that designates any one of the first item icons and is different from the first operation when the first item display screen is displayed on the display, using in the game the possessed item corresponding to the first item icon designated by the second operation; and
    a process of, in a case of receiving via the input device a third operation that designates any one of the second item icons when the second item display screen is displayed on the display, using in the game the possessed item corresponding to the second item icon designated by the third operation;
    wherein the game program causes the computer to further execute:
        a process of generating a list display data in which the second item icons are arranged in the order of expiration dates;
        when the first item display screen is switched to the second item display screen, a process of setting a display area of the list display data based on the first item icon designated by the first operation in the first item display screen; and
        a process of displaying the second item icons included in a range set by the display area in the list display data as an initial screen of the second item display screen, wherein the second item icons which are not included in the range set by the display area in the list display data are not displayed as the initial screen.

14. The non-transitory computer-readable medium according to claim 13, wherein in the first item display screen, each of the first item icons is displayed in association with a possessed number of the possessed items of the corresponding type.

15. The non-transitory computer-readable medium according to claim 14, wherein each of the first item icons is displayed together with a possessed number of the possessed items of the corresponding type, and each of the second item icons is displayed together with the expiration date of the corresponding possessed item.

16. The non-transitory computer-readable medium according to claim 13, wherein each of the first item icons is displayed together with a possessed number of the possessed items of the corresponding type, and each of the second item icons is displayed together with the expiration date of the corresponding possessed item.

17. The information processor according to claim 13, wherein the game program causes the computer to further execute, when the second item display screen is displayed, a process of changing the second item display screen by changing the display area of the list display data based on an operation of the user via the input device.

* * * * *